(12) United States Patent
Xu et al.

(10) Patent No.: US 10,348,390 B2
(45) Date of Patent: Jul. 9, 2019

(54) BACKHAUL DEVICE AND BACKHAUL DEVICE CONTROL METHOD

(71) Applicant: HUAWEI TECHNOLOGIES CO., LTD., Shenzhen (CN)

(72) Inventors: Xiangning Xu, Shanghai (CN); Bo Xing, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 130 days.

(21) Appl. No.: 15/177,800

(22) Filed: Jun. 9, 2016

(65) Prior Publication Data

US 2016/0294466 A1 Oct. 6, 2016

Related U.S. Application Data

(63) Continuation of application No. PCT/CN2013/089198, filed on Dec. 12, 2013.

(51) Int. Cl.
  *H04B 1/04* (2006.01)
  *H04B 1/16* (2006.01)
  *H04B 7/15* (2006.01)
  *H04L 5/14* (2006.01)

(52) U.S. Cl.
  CPC ............... *H04B 7/15* (2013.01); *H04B 1/04* (2013.01); *H04B 1/16* (2013.01); *H04L 5/14* (2013.01)

(58) Field of Classification Search
  None
  See application file for complete search history.

(56) References Cited

U.S. PATENT DOCUMENTS

2003/0236078 A1  12/2003  Jitsuhara
2007/0109962 A1  5/2007  Leng et al.
(Continued)

FOREIGN PATENT DOCUMENTS

CN  1964219 A  5/2007
CN  101321012 A  12/2008
(Continued)

OTHER PUBLICATIONS

Japanese Office Action dated May 30, 2017 in corresponding Japanese Patent Application No. 2016-538515.
(Continued)

*Primary Examiner* — Brandon M Renner
*Assistant Examiner* — The Hy Nguyen
(74) *Attorney, Agent, or Firm* — Staas & Halsey LLP

(57) ABSTRACT

Embodiments of the present invention relate to the field of network communications and provide a backhaul device and a backhaul device control method. The backhaul device includes: an access-side baseband transmit module, an access-side baseband receive module, a backhaul-side baseband transmit module, a backhaul-side baseband receive module, a radio frequency channel, a first switch module, a second switch module, an access antenna, and a backhaul antenna. Therefore, problems of low resource utilization of a radio frequency channel and high system development costs in the prior art are resolved, and the radio frequency channel can be shared, so as to improve resource utilization. In addition, considering that the radio frequency channel includes multiple components, the radio frequency channel is shared, which reduces a quantity of components required for a system and development costs of the system.

12 Claims, 6 Drawing Sheets

(56) References Cited

U.S. PATENT DOCUMENTS

| | | | |
|---|---|---|---|
| 2008/0014948 | A1 | 1/2008 | Scheinert |
| 2009/0103492 | A1 | 4/2009 | Altshuller et al. |
| 2009/0207761 | A1 | 8/2009 | Tangemann et al. |
| 2010/0159971 | A1* | 6/2010 | Herscovich ............ H04B 7/061 455/500 |
| 2012/0063383 | A1* | 3/2012 | Barbieri ............ H04W 72/082 370/315 |
| 2013/0170577 | A1 | 7/2013 | Matsuoka |
| 2014/0119237 | A1 | 5/2014 | Gan et al. |
| 2014/0213244 | A1* | 7/2014 | Oh ................... H04W 88/04 455/419 |
| 2015/0304018 | A1* | 10/2015 | Pitakdumrongkija ................... H04W 72/0446 370/315 |
| 2016/0198475 | A1* | 7/2016 | Uchiyama ............ H04W 52/38 370/329 |

FOREIGN PATENT DOCUMENTS

| | | |
|---|---|---|
| CN | 101515818 A | 8/2009 |
| CN | 101517924 A | 8/2009 |
| CN | 101765190 A | 6/2010 |
| CN | 201533369 U | 7/2010 |
| CN | 101904190 A | 12/2010 |
| CN | 101938291 A | 1/2011 |
| CN | 102123000 A | 7/2011 |
| CN | 102843701 A | 12/2012 |
| JP | 2002-84221 | 3/2002 |
| JP | 2004-23614 | 1/2004 |
| JP | 2012-60364 | 3/2012 |
| KR | 10-2011-0122114 | 11/2011 |
| WO | 2010/068047 A2 | 6/2010 |
| WO | 2011/115347 A1 | 9/2011 |

OTHER PUBLICATIONS

International Search Report and Written Opinion dated Sep. 29, 2014 in corresponding International Patent Application No. PCT/CN2013/089198.

International Search Report dated Sep. 29, 2014, in corresponding International Application No. PCT/CN2013/089198.

Chinese Office Action dated Feb. 24, 2018 in corresponding Chinese Patent Application No. 201380002869.3.

* cited by examiner

BACKHAUL DEVICE AND BACKHAUL DEVICE CONTROL METHOD

CROSS-REFERENCE TO RELATED APPLICATIONS

This application is a continuation of International Application No. PCT/CN2013/089198, filed on Dec. 12, 2013, which is hereby incorporated by reference in its entirety.

TECHNICAL FIELD

The present invention relates to the field of network communications technologies, and in particular, to a backhaul device and a backhaul device control method.

BACKGROUND

Air interface backhaul is a common data transmission manner used in a base station in which a baseband and radio frequency are integrated. In a communications system in TDD (time division duplex) mode, without adding a spectrum, an access side and a backhaul side can share a spectrum in TDD in-band relay by adjusting a timeslot.

Currently, the access side (Access Point Base Transceiver Station, AP BTS) and the backhaul side (Backhaul User Equipment, BH UE) of the TDD in-band relay use their respective independent radio frequency channels. Specifically, referring to FIG. 1, an access-side baseband transmit module 101 sends data to an access antenna 103 by using a radio frequency channel 102 corresponding to the access-side baseband transmit module 101, and the access antenna 103 sends the data to a terminal; the access antenna 103 receives the data, and sends the received data to an access-side baseband receive module 104 by using the corresponding radio frequency channel 102. Similarly, a backhaul-side baseband transmit module 105 sends data to a backhaul antenna 107 by using a radio frequency channel 106 corresponding to the backhaul-side baseband transmit module 105, and therefore the backhaul antenna 107 sends the data to the terminal; the backhaul antenna 107 receives backhaul data and sends the received backhaul data to a backhaul-side baseband receive module 108 by using the radio frequency channel 106.

During implementation of the present invention, the inventor finds that the existing solutions at least have the following problems:

Both a radio frequency channel on an access side and a radio frequency channel on a backhaul side can implement a same function, and therefore resource utilization of a radio frequency channel in the foregoing system is relatively low. In addition, because the access side and the backhaul side use their respective independent radio frequency channels, and each radio frequency channel includes multiple components, development costs of the foregoing system are relatively high.

SUMMARY

To resolve problems of low resource utilization and relatively high development costs in the prior art, embodiments of the present invention provide a backhaul device and a backhaul device control method. The technical solutions are as follows:

According to a first aspect, a backhaul device is provided, where the device includes:

an access-side baseband transmit module, an access-side baseband receive module, a backhaul-side baseband transmit module, a backhaul-side baseband receive module, a radio frequency channel, a first switch module, a second switch module, an access antenna, and a backhaul antenna;

the access-side baseband transmit module and the backhaul-side baseband transmit module are separately connected to one end of the radio frequency channel;

the access-side baseband receive module and the backhaul-side baseband receive module are separately connected to one end of the first switch module, and another end of the first switch module is connected to the one end of the radio frequency channel;

the first switch module is configured to maintain a connected state between the access-side baseband receive module and the one end of the radio frequency channel when the backhaul device is in an access state;

the first switch module is further configured to maintain a connected state between the backhaul-side baseband receive module and the one end of the radio frequency channel when the backhaul device is in a backhaul state;

one end of the second switch module is connected to another end of the radio frequency channel, and another end of the second switch module is separately connected to the access antenna and the backhaul antenna;

the second switch module is configured to maintain a connected state between the another end of the radio frequency channel and the access antenna when the backhaul device is in the access state; and the second switch module is further configured to maintain a connected state between the another end of the radio frequency channel and the backhaul antenna when the backhaul device is in the backhaul state.

In a first possible implementation manner of the first aspect, the access-side baseband transmit module and the backhaul-side baseband transmit module are separately connected to the one end of the radio frequency channel by using a third switch module;

the third switch module is configured to maintain a connected state between the access-side baseband transmit module and the one end of the radio frequency channel when the backhaul device is in the access state; and the third switch module is further configured to maintain a connected state between the backhaul-side baseband transmit module and the one end of the radio frequency channel when the backhaul device is in the backhaul state.

With reference to the first aspect or the first possible implementation manner of the first aspect, in a second possible implementation manner, the device further includes: a control module connected to the first switch module and the second switch module, and when the backhaul device includes the third switch module, the control module is further connected to the third switch module;

the control module is configured to acquire a state of the backhaul device;

the control module is further configured to control the first switch module and the second switch module according to the acquired state when the backhaul device includes the first switch module and the second switch module; and the control module is further configured to control the third switch module according to the acquired state when the backhaul device includes the third switch module.

With reference to the second possible implementation manner of the first aspect, in a third possible implementation manner, the device further includes a first storage module disposed in the radio frequency channel, where the first storage module is connected to the control module by using a dedicated line;

the first storage module is configured to store preset states of the backhaul device at different moments; and the control module is further configured to read the state of the backhaul device from the first storage module by using the dedicated line.

With reference to the second possible implementation manner of the first aspect, in a fourth possible implementation manner, the device further includes a second storage module disposed in the radio frequency channel, where the second storage module is connected to the control module by using a line between the another end of the radio frequency channel and the control module;

the second storage module is configured to store preset states of the backhaul device at different moments; and the control module is further configured to read the state of the backhaul device from the second storage module by using the line between the another end of the radio frequency channel and the control module.

With reference to the first aspect, the first possible implementation manner, the second possible implementation manner, the third possible implementation manner, or the fourth possible implementation manner of the first aspect, in a fifth possible implementation manner, the radio frequency channel includes:

a transmitter, a receiver connected to the first switch module, a circulator separately connected to the transmitter and the receiver, and a filter connected to the circulator, where another end of the filter is connected to the second switch module;

when the backhaul device does not include the third switch module, the transmitter is separately connected to the access-side baseband transmit module and the backhaul-side baseband transmit module; and when the backhaul device includes the third switch module, the transmitter is connected to the third switch module.

With reference to the first aspect, the first possible implementation manner, the second possible implementation manner, the third possible implementation manner, or the fourth possible implementation manner of the first aspect, in a sixth possible implementation manner, if there are two or more radio frequency channels, each radio frequency channel separately corresponds to a group of the access-side baseband transmit module, the access-side baseband receive module, the backhaul-side baseband transmit module, and the backhaul-side baseband receive module;

when the backhaul device includes the first storage module, the two or more radio frequency channels share the first storage module; and when the backhaul device includes the second storage module, the two or more radio frequency channels share the second storage module.

According to a second aspect, a backhaul device control method is provided, where the method is applied to the backhaul device according to the first aspect or each possible implementation manner of the first aspect, and the method includes:

acquiring a state of the backhaul device; and controlling the first switch module and the second switch module according to the acquired state when the backhaul device includes the first switch module and the second switch module, where:

the first switch module is configured to maintain a connected state between the access-side baseband receive module and the one end of the radio frequency channel when the backhaul device is in an access state;

the first switch module is further configured to maintain a connected state between the backhaul-side baseband receive module and the one end of the radio frequency channel when the backhaul device is in a backhaul state;

the second switch module is configured to maintain a connected state between the another end of the radio frequency channel and the access antenna when the backhaul device is in the access state; and the second switch module is further configured to maintain a connected state between the another end of the radio frequency channel and the backhaul antenna when the backhaul device is in the backhaul state.

In a first possible implementation manner of the second aspect, if the backhaul device further includes the third switch module that is configured to connect the radio frequency channel and the access-side baseband transmit module and the backhaul-side baseband transmit module in the backhaul device, the method further includes:

controlling the third switch module according to the acquired state, where:

the third switch module is configured to maintain a connected state between the access-side baseband transmit module and the one end of the radio frequency channel when the backhaul device is in the access state; and the third switch module is further configured to maintain a connected state between the backhaul-side baseband transmit module and the one end of the radio frequency channel when the backhaul device is in the backhaul state.

With reference to the second aspect or the first possible implementation manner of the second aspect, in a second possible implementation manner, the acquiring a state of the backhaul device includes:

when the backhaul device includes the first storage module, reading the state of the backhaul device from the first storage module by using a dedicated line connected to the first storage module; and when the backhaul device includes the second storage module, reading the state of the backhaul device from the second storage module by using a line connected to the another end of the radio frequency channel.

Beneficial effects of the technical solutions provided in the embodiments of the present invention are:

A switch module is disposed, so that an access side and a backhaul side can share a same radio frequency channel. Therefore, problems of low resource utilization of a radio frequency channel and relatively high development costs in the prior art are resolved, and the radio frequency channel can be shared, so as to improve resource utilization. In addition, considering that the radio frequency channel includes multiple components, the radio frequency channel is shared, which reduces a quantity of components required for a system and development costs of the system.

BRIEF DESCRIPTION OF DRAWINGS

To describe the technical solutions according to the embodiments of the present invention more clearly, the following briefly describes the accompanying drawings for describing the embodiments. Apparently, the accompanying drawings in the following description are only some embodiments of the present invention, and a person of ordinary skill in the art can derive other drawings from the accompanying drawings without creative efforts.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
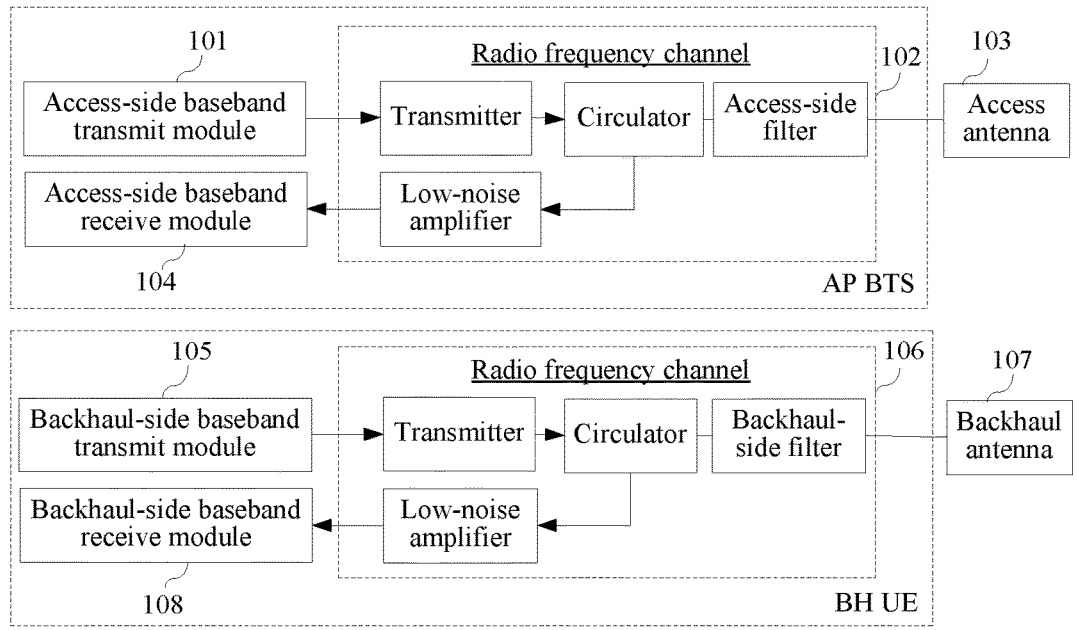
FIG. 1 is a schematic structural diagram of a backhaul device involved in Background of the present invention.
Figure 2:
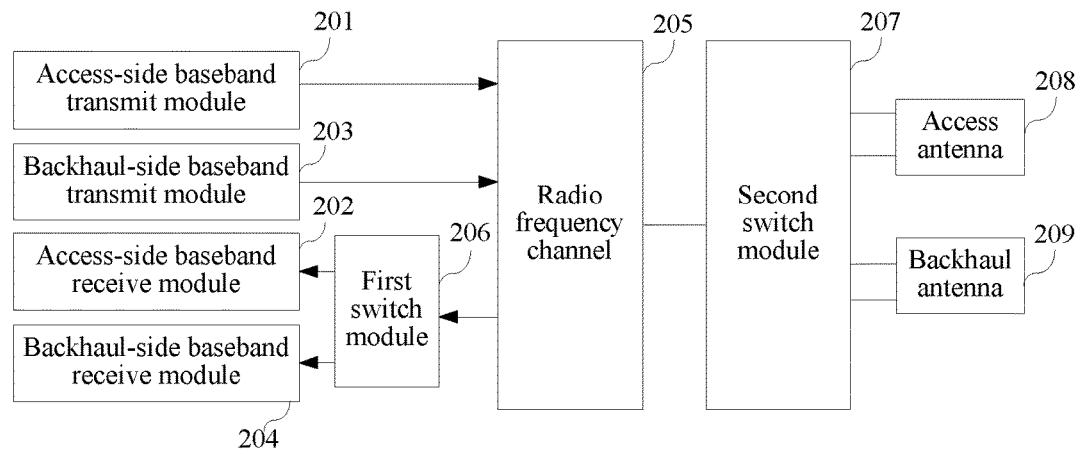
FIG. 2 is a structural block diagram of a backhaul device according to an embodiment of the present invention.

Referring to FIG. 2, FIG. 2 shows a structural block diagram of a backhaul device according to an embodiment of the present invention. The backhaul device may be applied to a mobile communications system, or may be applied to systems such as a fixed wireless access system, a wireless data transmission system, and a radar system. The backhaul device (AB BTS) includes: an access-side baseband transmit module 201, an access-side baseband receive module 202, a backhaul-side baseband transmit module 203, a backhaul-side baseband receive module 204, a radio frequency channel 205, a first switch module 206, a second switch module 207, an access antenna 208, and a backhaul antenna 209.

The access-side baseband transmit module 201 and the backhaul-side baseband transmit module 203 are separately connected to one end of the radio frequency channel 205.

The access-side baseband receive module 202 and the backhaul-side baseband receive module 204 are separately connected to one end of the first switch module 206, and another end of the first switch module 206 is connected to the one end of the radio frequency channel 205.

The first switch module 206 is configured to maintain a connected state between the access-side baseband receive module 202 and the one end of the radio frequency channel 205 when the backhaul device is in an access state.

The first switch module 206 is further configured to maintain a connected state between the backhaul-side baseband receive module 204 and the one end of the radio frequency channel 205 when the backhaul device is in a backhaul state.

One end of the second switch module 207 is connected to another end of the radio frequency channel 205, and another end of the second switch module 207 is separately connected to the access antenna 208 and the backhaul antenna 209.

The second switch module 207 is configured to maintain a connected state between the another end of the radio frequency channel 205 and the access antenna 208 when the backhaul device is in the access state.

The second switch module 207 is further configured to maintain a connected state between the another end of the radio frequency channel 205 and the backhaul antenna 209 when the backhaul device is in the backhaul state.

In conclusion, according to the backhaul device provided in this embodiment, a switch module is disposed, so that an access side and a backhaul side can share a same radio frequency channel. Therefore, problems of low resource utilization of a radio frequency channel and high development costs in the prior art are resolved, and the radio frequency channel can be shared, so as to improve resource utilization. In addition, considering that the radio frequency channel includes multiple components, the radio frequency channel is shared, which reduces a quantity of components required for a system and development costs of the system.

Figure 3:
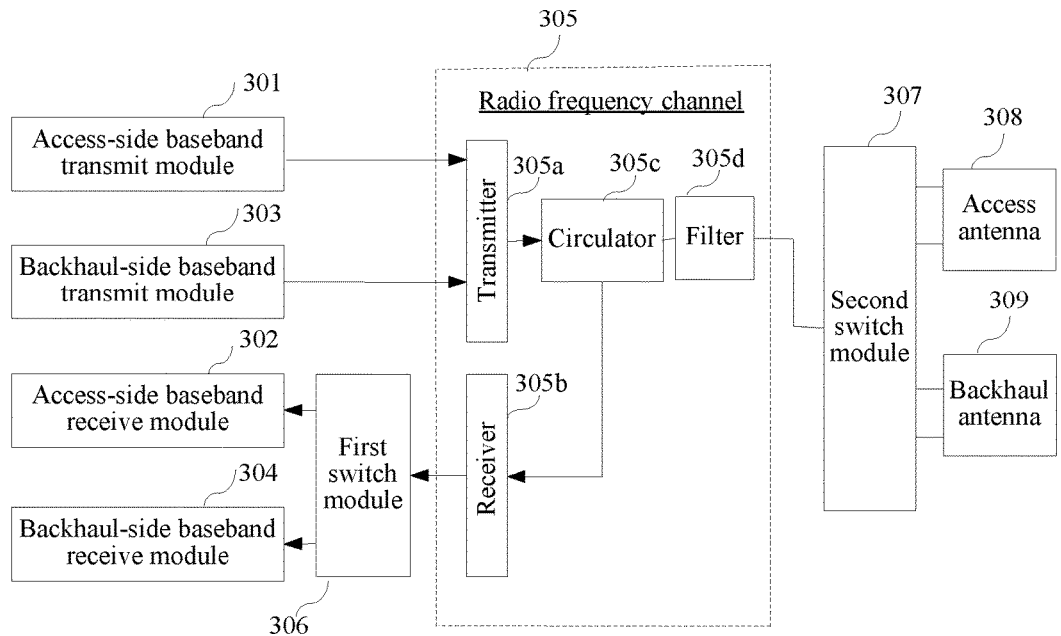
FIG. 3 is a structural block diagram of a backhaul device according to another embodiment of the present invention.

Referring to FIG. 3, FIG. 3 shows a structural block diagram of a backhaul device according to an embodiment of the present invention. The backhaul device may be applied to a mobile communications system, or may be applied to systems such as a fixed wireless access system, a wireless data transmission system, and a radar system. The backhaul device includes: an access-side baseband transmit module 301, an access-side baseband receive module 302, a backhaul-side baseband transmit module 303, a backhaul-side baseband receive module 304, a radio frequency channel 305, a first switch module 306, a second switch module 307, an access antenna 308, and a backhaul antenna 309.

The access-side baseband transmit module 301 and the backhaul-side baseband transmit module 303 are separately connected to one end of the radio frequency channel 305.

The access-side baseband receive module 302 and the backhaul-side baseband receive module 304 are separately connected to one end of the first switch module 306, and another end of the first switch module 306 is connected to the one end of the radio frequency channel 305.

The first switch module 306 is configured to maintain a connected state between the access-side baseband receive module 302 and the one end of the radio frequency channel 305 when the backhaul device is in an access state.

Specifically, because the backhaul device can send broadcast information in real time, when a terminal is started, the backhaul device may negotiate, by using the broadcast information, with the terminal about when to perform access and when to perform backhaul, and after the negotiation is completed, both the backhaul device and the terminal perform access and backhaul at a negotiated moment. When an access moment arrives, the backhaul device is in an access state, and when the backhaul device is in the access state, there are two cases, where one case is that the access-side baseband transmit module 301 sends data to the outside by using the radio frequency channel 305 and the access antenna 308, and the other case is that the access-side baseband receive module 302 receives data that is received by the access antenna 308 and that is transmitted by using the radio frequency channel 305. Therefore, when the backhaul device is in the access state, the first switch module 306 maintains the connected state between the access-side baseband receive module 302 and the one end of the radio frequency channel 305.

The first switch module 306 is further configured to maintain a connected state between the backhaul-side baseband receive module 304 and the one end of the radio frequency channel 305 when the backhaul device is in a backhaul state.

Similar to a case in which the backhaul device is in the access state, when the backhaul device is in a backhaul state, there are also two cases, where one case is that the backhaul-side baseband transmit module 303 sends data to the outside by using the radio frequency channel 305 and the backhaul antenna 309, and the other case is that the backhaul-side baseband receive module 304 receives data that is received by the backhaul antenna 309 and that is transmitted by using the radio frequency channel 305. Therefore, when the backhaul device is in the backhaul state, the first switch module 306 maintains the connected state between the backhaul-side baseband receive module 304 and the one end of the radio frequency channel 305.

One end of the second switch module 307 is connected to another end of the radio frequency channel 305, and another end of the second switch module 307 is separately connected to the access antenna 308 and the backhaul antenna 309.

Specifically, because the access antenna 308 and the backhaul antenna 309 each have two pins, and in order that the second switch module 307 can be connected to the access antenna 308 and the backhaul antenna 309, the another end of the second switch module 307 may have four ports, and the four ports are respectively connected to the pins of the access antenna 308 and the backhaul antenna 309. Certainly, during actual implementation, multiple ports may further be disposed on the another end of the second switch module 307 according to different use requirements, which is not limited in this embodiment.

The second switch module 307 is configured to maintain a connected state between the another end of the radio frequency channel 305 and the access antenna 308 when the backhaul device is in the access state.

When the backhaul device is in the access state, the radio frequency channel 305 needs to exchange data with the access antenna 308. Therefore, in this case, the second switch module 307 may maintain the connected state between the another end of the radio frequency channel 305 and the access antenna 308.

The second switch module 307 is further configured to maintain a connected state between the another end of the radio frequency channel 305 and the backhaul antenna 309 when the backhaul device is in the backhaul state.

However, when the backhaul device is in the backhaul state, the radio frequency channel 305 needs to exchange data with the backhaul antenna 309. Therefore, in this case, the second switch module 307 may maintain the connected state between the another end of the radio frequency channel 305 and the backhaul antenna 309.

It should be noted that in this embodiment, the radio frequency channel 305 specifically includes:

a transmitter (TX) 305a, a receiver (RX) 305b connected to the first switch module 306, a circulator 305c separately connected to the transmitter 305a and the receiver 305b, and a filter 305d connected to the circulator 305c, where another end of the filter 305d is connected to the second switch module 307.

The transmitter 305a is separately connected to the access-side baseband transmit module 301 and the backhaul-side baseband transmit module 303.

In conclusion, according to the backhaul device provided in this embodiment, a switch module is disposed, so that an access side and a backhaul side can share a same radio frequency channel. Therefore, problems of low resource utilization of a radio frequency channel and high system development costs in the prior art are resolved, and the radio frequency channel can be shared, so as to improve resource utilization. In addition, considering that the radio frequency channel includes multiple components, the radio frequency channel is shared, which reduces a quantity of components required for a system and development costs of the system.

This embodiment limits specific composition of the radio frequency channel, and further clarifies specific construction of the backhaul device.

Figure 4:
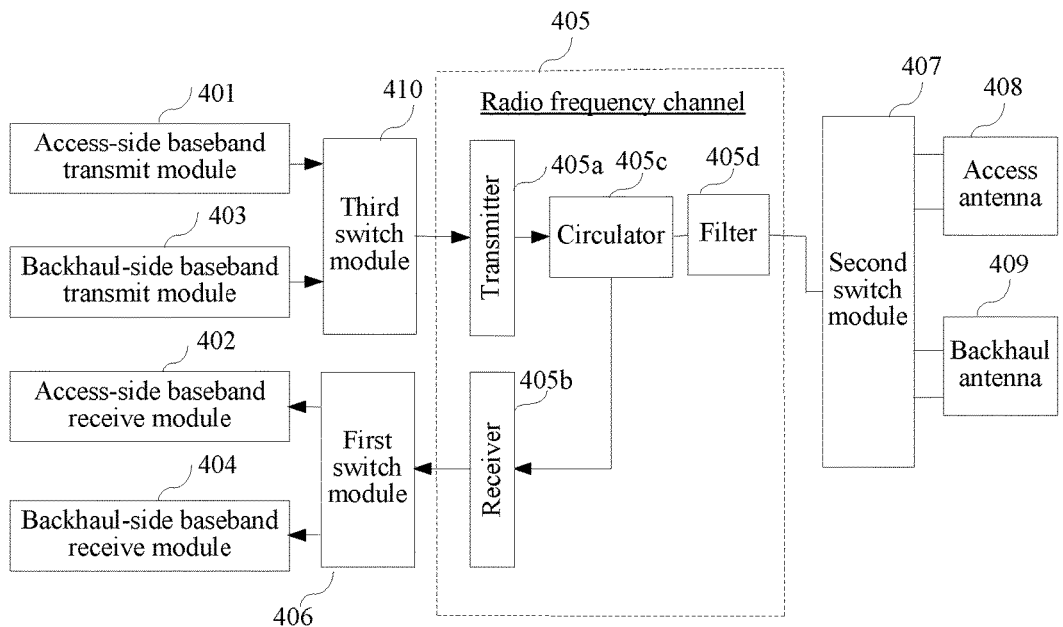
FIG. 4 is a structural block diagram of a backhaul device according to still another embodiment of the present invention.

Referring to FIG. 4, FIG. 4 shows a structural block diagram of a backhaul device according to another embodiment of the present invention. The backhaul device may be applied to a mobile communications system, or may be applied to systems such as a fixed wireless access system, a wireless data transmission system, and a radar system. The backhaul device includes: an access-side baseband transmit module 401, an access-side baseband receive module 402, a backhaul-side baseband transmit module 403, a backhaul-side baseband receive module 404, a radio frequency channel 405, a first switch module 406, a second switch module 407, an access antenna 408, and a backhaul antenna 409. This backhaul device differs from the backhaul device shown in FIG. 3 in that in this embodiment, the access-side baseband transmit module 401 and the backhaul-side baseband transmit module 403 are separately connected to one end of the radio frequency channel 405 by using a third switch module 410.

The third switch module 410 is configured to maintain a connected state between the access-side baseband transmit module 401 and the one end of the radio frequency channel 405 when the backhaul device is in an access state.

Specifically, when the backhaul device is in the access state, one case is that the access-side baseband transmit module 401 sends baseband data to the radio frequency channel 405, so that the radio frequency channel 405 performs frequency conversion on the received baseband data, then sends the data to the access antenna 408, and further sends the data to an external terminal. Therefore, when the backhaul device is in the access state, the third switch module 410 maintains the connected state between the access-side baseband transmit module 401 and the one end of the radio frequency channel 405.

The third switch module 410 is further configured to maintain a connected state between the backhaul-side baseband transmit module 403 and the one end of the radio frequency channel 405 when the backhaul device is in a backhaul state.

Specifically, when the backhaul device is in the backhaul state, one case is that the backhaul-side baseband transmit module 403 sends baseband data to the radio frequency channel 405, so that the radio frequency channel 405 performs frequency conversion on the received baseband data, then sends the data to the backhaul antenna 409, and further sends the data to an external terminal. Therefore, when the backhaul device is in the backhaul state, the third switch module 410 maintains the connection state between the backhaul-side baseband transmit module 403 and the one end of the radio frequency channel 405.

Similar to the embodiment shown in FIG. 3, in this embodiment, the radio frequency channel 405 may also include:

a transmitter 405a, a receiver 405b connected to the first switch module 404, a circulator 405c separately connected to the transmitter 405a and the receiver 405b, and a filter 405d connected to the circulator 405c, where another end of the filter 405d is connected to the second switch module 407.

However, in this embodiment, because the backhaul device further includes the third switch module 410, during actual implementation, the transmitter 405a is connected to the third switch module 410.

Specifically, when the backhaul device includes the third switch module 410, the access-side baseband transmit module 401 and the backhaul-side baseband transmit module 403 may be connected to the radio frequency channel 405 by using the third switch module 410. Therefore, in this case, the transmitter 405a in the radio frequency channel 405 may be connected to the third switch module 410. For details, refer to FIG. 4.

In conclusion, according to the backhaul device provided in this embodiment, a switch module is disposed, so that an access side and a backhaul side can share a same radio frequency channel. Therefore, problems of low resource utilization of a radio frequency channel and high development costs in the prior art are resolved, and the radio frequency channel can be shared, so as to improve resource utilization. In addition, considering that the radio frequency channel includes multiple components, the radio frequency channel is shared, which reduces a quantity of components required for a system and development costs of the system.

In this embodiment, the access-side baseband transmit module and the backhaul-side baseband transmit module are connected to the radio frequency channel by using the third switch module, and therefore when the backhaul device is in the access state, only the access-side baseband transmit module is connected to the radio frequency channel, and when the backhaul device is in the backhaul state, only the backhaul-side baseband transmit module is connected to the radio frequency channel.

Figure 5:
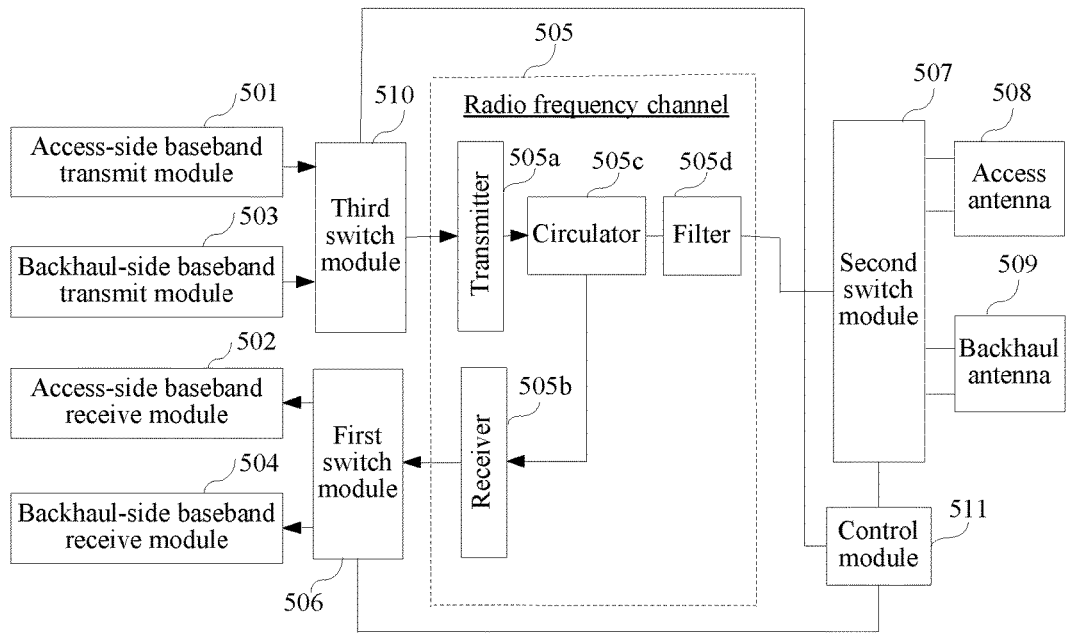
FIG. 5 is a structural block diagram of a backhaul device according to still another embodiment of the present invention.

Referring to FIG. 5, FIG. 5 shows a structural block diagram of a backhaul device according to still another embodiment of the present invention. The backhaul device may be applied to a mobile communications system, or may be applied to systems such as a fixed wireless access system, a wireless data transmission system, and a radar system. The backhaul device includes: an access-side baseband transmit module 501, an access-side baseband receive module 502, a backhaul-side baseband transmit module 503, a backhaul-side baseband receive module 504, a radio frequency channel 505, a first switch module 506, a second switch module 507, an access antenna 508, and a backhaul antenna 509. The modules in the backhaul device may be connected in a connection manner in each of the foregoing embodiments and implement functions that can be implemented by same modules in each of the foregoing embodiments, and the only difference from the backhaul device in each of the foregoing embodiments is that in this embodiment, the backhaul device further includes a control module 511 connected to the first switch module 506 and the second switch module 507. In addition, when the backhaul device includes a third switch module 510, the control module 511 is further connected to the third switch module 510. For details, refer to FIG. 5.

The control module 511 is configured to acquire a state of the backhaul device.

Specifically, to learn a current state of the backhaul device, the backhaul device may further include the control module 511, and the control module 511 may be configured to acquire the state of the backhaul device.

The control module 511 is further configured to control the first switch module 506 and the second switch module 507 according to the acquired state when the backhaul device includes the first switch module 506 and the second switch module 507.

Because both the first switch module 506 and the second switch module 507 have different connection statuses according to different states of the backhaul device, after the control module 511 acquires the state of the backhaul device, the control module 511 may be further configured to control the first switch module 506 and the second switch module 507 according to the acquired state.

The control module 511 is further configured to control the third switch module 510 according to the acquired state when the backhaul device includes the third switch module 510.

Similarly, when the backhaul device further includes the third switch module 510, because the third switch module 510 also has different connection statuses according to different states of the backhaul device, the control module 511 may be further configured to control the third switch module 510 according to the acquired state when the backhaul device includes the third switch module 510.

It should be noted that FIG. 5 disclosed in this embodiment is described by using a case in which the backhaul device includes the third switch module 510 as an example. During actual implementation, when the backhaul device does not include the third switch module 510, a specific structural block diagram of the backhaul device is similar to FIG. 5, except that the access-side baseband transmit module 501 and the backhaul-side baseband transmit module 503 in FIG. 5 are directly connected to the transmitter 505a. Details are not described again in this embodiment.

In conclusion, according to the backhaul device provided in this embodiment, a switch module is disposed, so that an access side and a backhaul side can share a same radio frequency channel. Therefore, problems of low resource utilization of a radio frequency channel and high development costs in the prior art are resolved, and the radio frequency channel can be shared, so as to improve resource utilization. In addition, considering that the radio frequency channel includes multiple components, the radio frequency channel is shared, which reduces a quantity of components required for a system and development costs of the system.

In this embodiment, the control module acquires a state of the backhaul device, achieving an effect of controlling each switch module in the device according to the acquired state.

Figure 6:
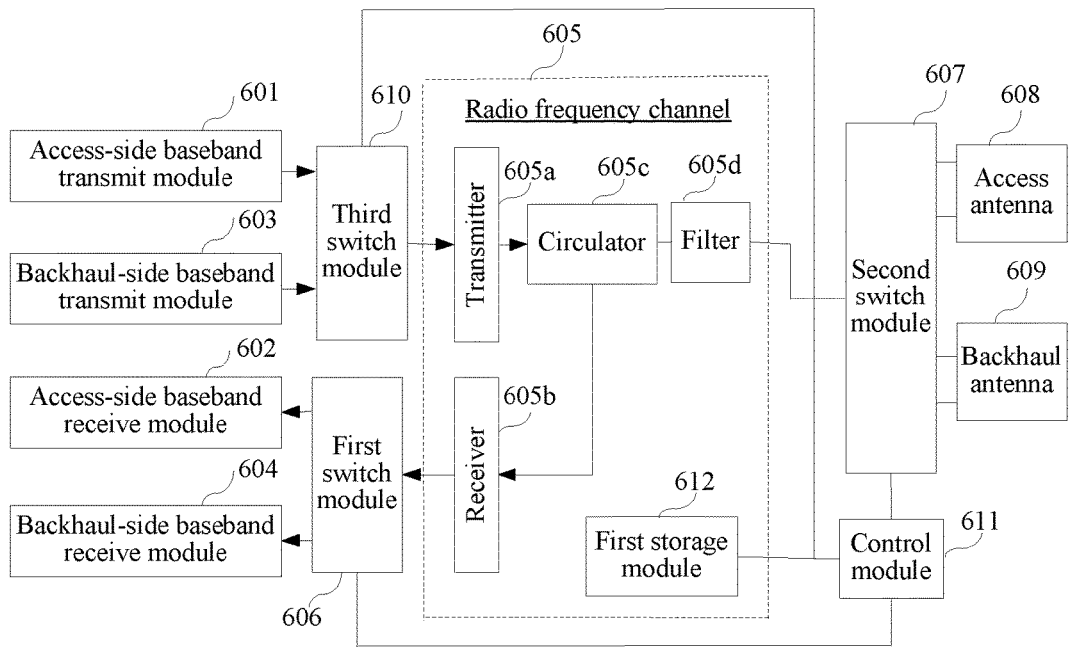
FIG. 6 is a structural block diagram of a backhaul device according to still another embodiment of the present invention.

Referring to FIG. 6, FIG. 6 shows a structural block diagram of a backhaul device according to still another embodiment of the present invention. The backhaul device may be applied to a mobile communications system, or may be applied to systems such as a fixed wireless access system, a wireless data transmission system, and a radar system. The backhaul device includes: an access-side baseband transmit module 601, an access-side baseband receive module 602, a backhaul-side baseband transmit module 603, a backhaul-side baseband receive module 604, a radio frequency channel 605, a first switch module 606, a second switch module 607, an access antenna 608, and a backhaul antenna 609. In addition, in this embodiment, the backhaul device may further include a third switch module 610, and certainly, during actual implementation, the backhaul device may not include the third switch module 610. In this embodiment, an example in which the backhaul device includes the third switch module 610 is used. In addition, the same as the backhaul device shown in FIG. 5, the backhaul device in this embodiment further includes a control module 611; while the backhaul device differs from the backhaul device shown in FIG. 5 in that in this embodiment, the backhaul device further includes a first storage module 612 disposed in the radio frequency channel 605, where the first storage module 612 is connected to the control module 611 by using a dedicated line.

The first storage module 612 is configured to store preset states of the backhaul device at different moments.

Specifically, because the backhaul device may negotiate with a terminal about the states at different moments when the terminal is powered on, for convenience of subsequently using the negotiated states, the backhaul device may further include the first storage module 612 disposed in the radio frequency channel 605, where the first storage module 612 is configured to store the pre-negotiated states of the backhaul device at different moments.

The control module 611 is further configured to read a state of the backhaul device from the first storage module 612 by using the dedicated line.

Accordingly, because the first storage module 612 stores the states of the backhaul device, and the first storage module 612 is connected to the control module 611 by using the dedicated line, the control module 611 may read the state of the backhaul device from the first storage module 612 by using the dedicated line. For example, if in the first storage module 612, a high level '1' is used to represent an access state, and a low level '0' is used to represent a backhaul state, when the control module 611 reads the high level, the control module 611 may learn that the backhaul device is in the access state at this moment; and when the control module 611 reads the low level, the control module 611 may learn that the backhaul device is in the backhaul state at this moment. In this embodiment, representing the state of the backhaul device by using the foregoing method is merely used as an example, and during actual implementation, any method that can be used to distinguish two states may be used to identify the states. Details are not described again in this embodiment.

It should be noted that FIG. 6 disclosed in this embodiment is a case in which the backhaul device includes the third switch module 610. During actual implementation, when the backhaul device does not include the third switch module 610, a specific structural block diagram of the backhaul device is similar to FIG. 6, except that the access-side baseband transmit module 601 and the backhaul-side baseband transmit module 603 in FIG. 6 are directly connected to a transmitter 605a. Therefore, details are not described again in this embodiment.

In conclusion, according to the backhaul device provided in this embodiment, a switch module is disposed, so that an access side and a backhaul side can share a same radio frequency channel. Therefore, problems of low resource utilization of a radio frequency channel and high development costs in the prior art are resolved, and the radio frequency channel can be shared, so as to improve resource utilization. In addition, considering that the radio frequency channel includes multiple components, the radio frequency channel is shared, which reduces a quantity of components required for a system and development costs of the system.

In this embodiment, a state of the backhaul device is stored in the first storage module disposed in the radio frequency channel, so that the control module in the backhaul device can acquire the state from the first storage module, and further control each switch module in the backhaul device according to the acquired state.

Figure 7:
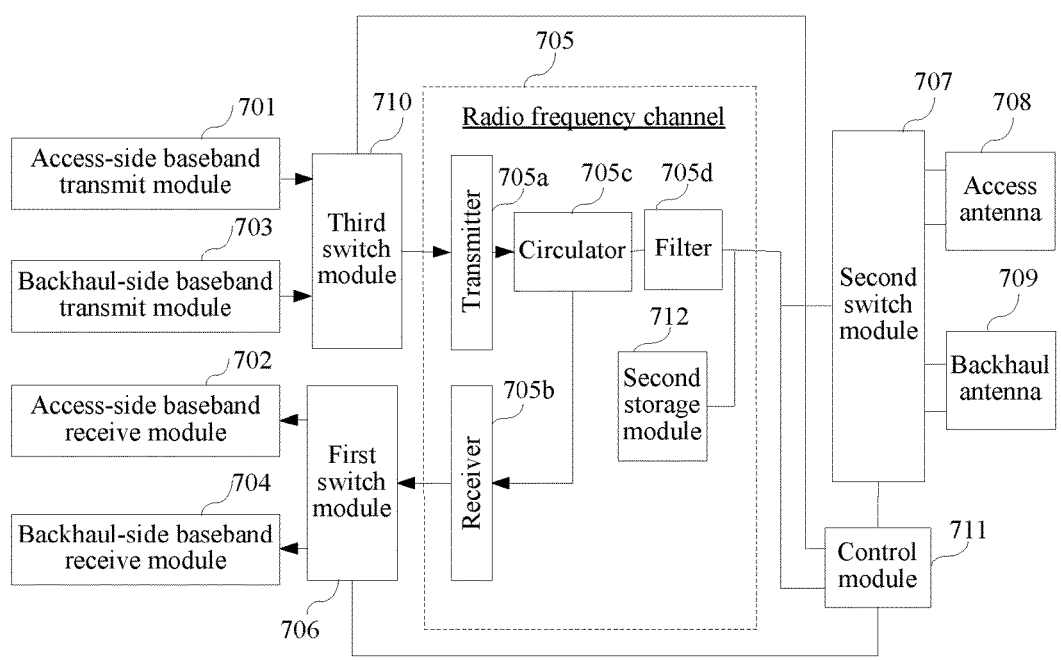
FIG. 7 is a structural block diagram of a backhaul device according to still another embodiment of the present invention.

Referring to FIG. 7, FIG. 7 shows a structural block diagram of a backhaul device according to still another embodiment of the present invention. The backhaul device may be applied to a mobile communications system, or may be applied to systems such as a fixed wireless access system, a wireless data transmission system, and a radar system. The backhaul device includes: an access-side baseband transmit module 701, an access-side baseband receive module 702, a backhaul-side baseband transmit module 703, a backhaul-side baseband receive module 704, a radio frequency channel 705, a first switch module 706, a second switch module 707, an access antenna 708, and a backhaul antenna 709. In addition, in this embodiment, the backhaul device may further include a third switch module 710, and certainly, during actual implementation, the backhaul device may not include the third switch module 710. In this embodiment, an example in which the backhaul device includes the third switch module 710 is used. In addition, the backhaul device in this embodiment further includes a control module 711; the backhaul device differs from the backhaul device shown in FIG. 6 in that in the embodiment shown in FIG. 6, storing a state of the backhaul device in the first storage module 612 is used as an example, while in this embodiment, the state of the backhaul device may be further stored in a second storage module 712. Specifically, the backhaul device further includes the second storage module 712 disposed in the radio frequency channel 705, where the second storage module 712 is connected to the control module 711 by using a line between another end of the radio frequency channel 705 and the control module 711. In this embodiment, an example in which the backhaul device includes the third switch module 710 is used, and for a structural block diagram of the backhaul device, refer to FIG. 7.

Specifically, different from the embodiment shown in FIG. 6, in the foregoing embodiment, the first storage module 612 configured to store a state of the backhaul device may be connected to the control module 611 by using a dedicated line, and because the control module 611 needs to be connected to the radio frequency channel 605, in this embodiment, to save a connection line between the control module 711 and the second storage module 712, the second storage module 712 may be connected to the control module 711 by using the line between the another end of the radio frequency channel 705 and the control module 711. During actual implementation, the second storage module 712 may be coupled to the another end of the radio frequency channel 705 by using an inductor, and a specific implementation manner thereof is not limited in this embodiment.

The second storage module 712 is configured to store preset states of the backhaul device at different moments.

Specifically, because the backhaul device may negotiate with a terminal about the states at different moments when the terminal is powered on, for convenience of subsequently using the negotiated states, the backhaul device may further include the second storage module 712 disposed in the radio frequency channel 705, where the second storage module 712 is configured to store the pre-negotiated states of the backhaul device at different moments.

The control module 711 is further configured to read a state of the backhaul device from the second storage module 712 by using the line between the another end of the radio frequency channel 705 and the control module 711.

Accordingly, because the second storage module 712 stores the states of the backhaul device, and the second storage module 712 is connected to the control module 711 by using the line between the another end of the radio frequency channel 705 and the control module 711, the control module 711 may read the state of the backhaul device from the second storage module 712 by using the line between the another end of the radio frequency channel 705 and the control module 711.

It should be noted that FIG. 7 disclosed in this embodiment is a case in which the backhaul device includes the third switch module 710. During actual implementation, when the backhaul device does not include the third switch module 710, a specific structural block diagram of the backhaul device is similar to FIG. 7, except that the access-side baseband transmit module 701 and the backhaul-side baseband transmit module 703 in FIG. 7 are directly connected to a transmitter 705a. Therefore, details are not described again in this embodiment.

In conclusion, according to the backhaul device provided in this embodiment, a switch module is disposed, so that an access side and a backhaul side can share a same radio frequency channel. Therefore, problems of low resource utilization of a radio frequency channel and high development costs in the prior art are resolved, and the radio frequency channel can be shared, so as to improve resource utilization. In addition, considering that the radio frequency channel includes multiple components, the radio frequency channel is shared, which reduces a quantity of components required for a system and development costs of the system.

In this embodiment, a state of the backhaul device is stored in the second storage module disposed in the radio frequency channel, so that the control module in the backhaul device can acquire the state from the second storage module, and further control each switch module in the backhaul device according to the acquired state. In addition, in this embodiment, an output end of the second storage module in which the state of the backhaul device is stored is coupled to the radio frequency channel, which reduces connections required in the backhaul device, and further simplifies the backhaul device.

Figure 8:
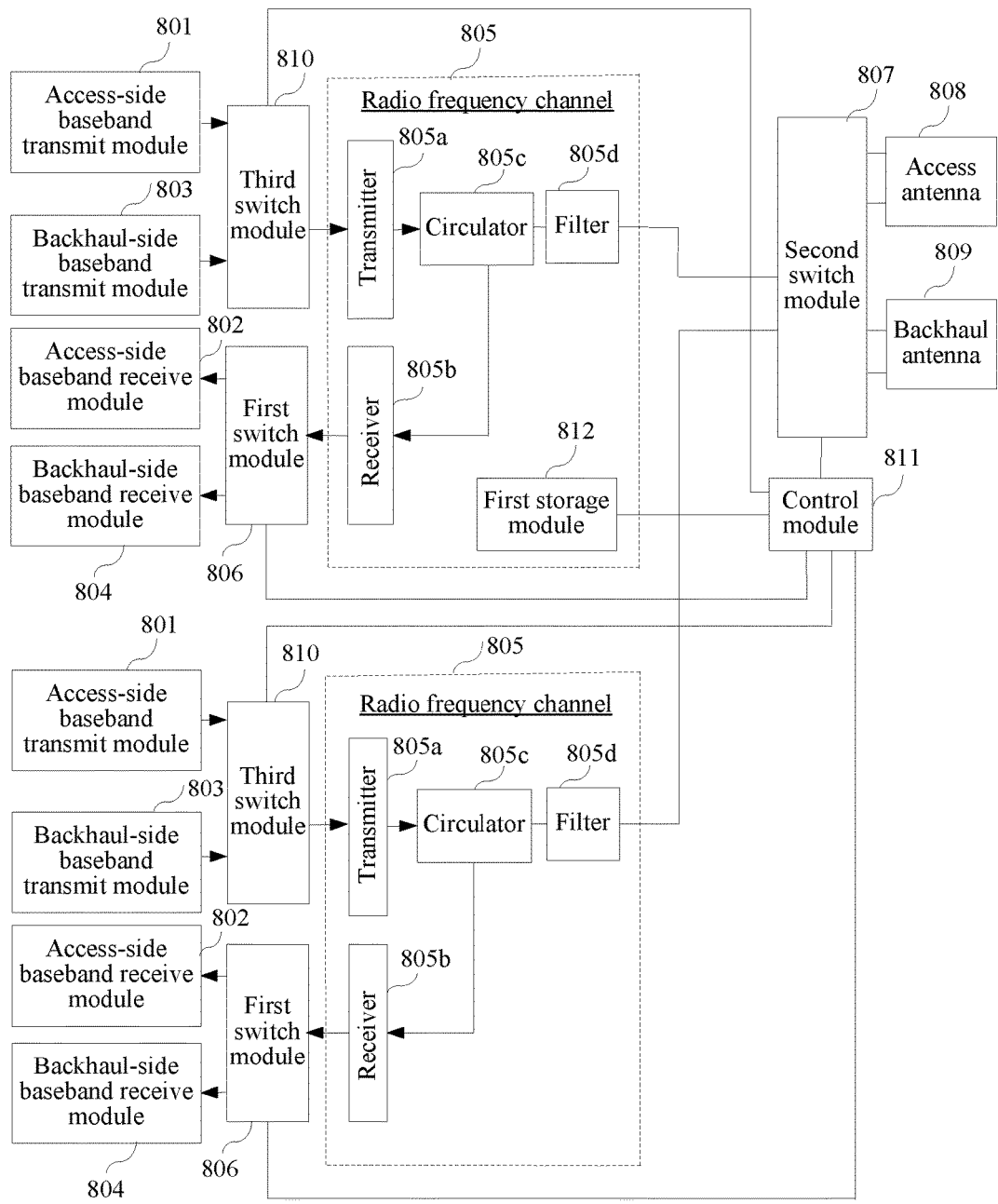
FIG. 8 is a structural block diagram of a backhaul device according to still another embodiment of the present invention.

Referring to FIG. 8, FIG. 8 shows a structural block diagram of a backhaul device according to still another embodiment of the present invention. The backhaul device may be applied to a mobile communications system, or may be applied to systems such as a fixed wireless access system, a wireless data transmission system, and a radar system. The backhaul device includes: an access-side baseband transmit module 801, an access-side baseband receive module 802, a backhaul-side baseband transmit module 803, a backhaul-side baseband receive module 804, a radio frequency channel 805, a first switch module 806, a second switch module 807, an access antenna 808, and a backhaul antenna 809. In addition, in this embodiment, the backhaul device may further include a third switch module 810, and certainly, during actual implementation, the backhaul device may not include the third switch module 810. In this embodiment, an example in which the backhaul device includes the third switch module 810 is used. In addition, the backhaul device in this embodiment may further include a control module 811; the backhaul device differs from the backhaul device disclosed in each of the foregoing embodiments in that in this embodiment, there are two or more radio frequency channels 805, and each radio frequency channel 805 separately corresponds to a group of the access-side baseband transmit module 801, the access-side baseband receive module 802, the backhaul-side baseband transmit module 803, and the backhaul-side baseband receive module 804.

When the backhaul device includes a first storage module 812, the two or more radio frequency channels 805 share the first storage module 812.

Specifically, the backhaul device may include the two or more radio frequency channels 805, and each radio frequency channel 805 may separately correspond to a group of the access-side baseband transmit module 801, the access-side baseband receive module 802, the backhaul-side baseband transmit module 803, and the backhaul-side baseband receive module 804. All groups have a same structure, and all groups of modules and the radio frequency channel 805 also have a same connection structure. However, because a state of the backhaul device is uniquely determined, when the backhaul device includes the first storage module 812, to reduce a quantity of components in the backhaul device and later-period maintenance costs, the two or more radio frequency channels 805 in the backhaul device may share the first storage module 812, which is not limited in this embodiment. Each group of modules may separately correspond to one second switch module 807 to connect to the access antenna 808 and the backhaul antenna 809. In addition, to reduce the quantity of components in the device, improve resource utilization of the second switch module 807, and reduce maintenance complexity, the radio frequency channels 805 corresponding to the groups of modules may share one second switch module 807, and details are not described again in this embodiment. For example, the backhaul device includes two groups of modules, and the backhaul device includes the third switch module 810. for a schematic diagram of a specific connection structure thereof, reference may be made to FIG. 8, and details are not described again in this embodiment.

Similarly, when the backhaul device includes a second storage module, the two or more radio frequency channels share the second storage module, which is similar to a case in which the backhaul device includes the first storage module 812, except that a connection manner between the second storage module and the control module is different from a connection manner between the first storage module and the control module, and details are not described again in this embodiment.

It should be noted that only an example in which the backhaul device shown in FIG. 6 includes two or more radio frequency channels is used in this embodiment. During actual implementation, the backhaul device shown in any one of FIG. 2, FIG. 3, FIG. 4, FIG. 5, and FIG. 7 may also include two or more radio frequency channels at the same time. A person skilled in the art can also easily obtain, according to FIG. 6 and FIG. 8, a structural block diagram that includes two or more radio frequency channels 805 and that is corresponding to each of FIG. 2, FIG. 3, FIG. 4, FIG. 5, and FIG. 7, and details are not described one by one again in this embodiment.

In conclusion, according to the backhaul device provided in this embodiment, a switch module is disposed, so that an access side and a backhaul side can share a same radio frequency channel. Therefore, problems of low resource utilization of a radio frequency channel and high development costs in the prior art are resolved, and the radio frequency channel can be shared, so as to improve resource utilization. In addition, considering that the radio frequency channel includes multiple components, the radio frequency channel is shared, which reduces a quantity of components required for a system and development costs of the system.

The backhaul device in this embodiment may include two or more radio frequency channels, thereby improving working performance of the backhaul device.

It should be noted that during actual implementation, modules before the control module may be specifically implemented as one device, while the control module, the second switch module, the access antenna, and the backhaul antenna may be separately implemented, and a specific implementation form thereof is not limited in this embodiment.

In addition, each module involved in the foregoing embodiment may be implemented by using software, hardware, or a combination thereof, and a specific implementation form of the module is not limited in this embodiment.

Figure 9:
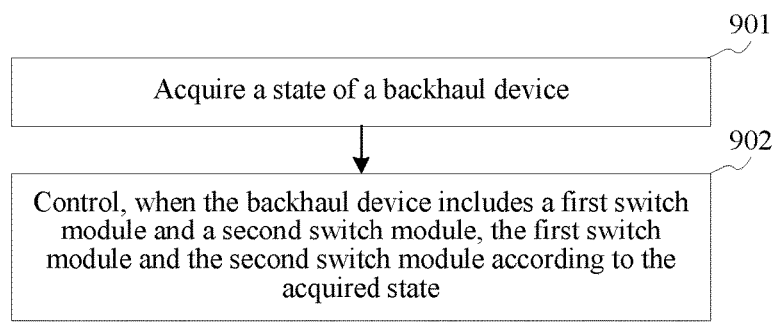
FIG. 9 is a method flowchart of a backhaul device control method according to an embodiment of the present invention.

Referring to FIG. 9, FIG. 9 shows a method flowchart of a backhaul device control method according to an embodiment of the present invention. The backhaul device control method may be used to control the backhaul device provided in each of the foregoing embodiments, and the control method may include the following steps:

Step 901: Acquire a state of a backhaul device.

Step 902: Control a first switch module and a second switch module according to the acquired state when the backhaul device includes the first switch module and the second switch module, where:

the first switch module is configured to maintain a connected state between an access-side baseband receive module and one end of a radio frequency channel when the backhaul device is in an access state;

the first switch module is further configured to maintain a connected state between a backhaul-side baseband receive module and the one end of the radio frequency channel when the backhaul device is in a backhaul state;

the second switch module is configured to maintain a connected state between the another end of the radio frequency channel and an access antenna when the backhaul device is in the access state; and the second switch module is further configured to maintain a connected state between the another end of the radio frequency channel and a backhaul antenna when the backhaul device is in the backhaul state.

In conclusion, according to the backhaul device control method provided in this embodiment, a switch module is disposed, so that an access side and a backhaul side can share a same radio frequency channel. Therefore, problems of low resource utilization of a radio frequency channel and high development costs in the prior art are resolved, and the radio frequency channel can be shared, so as to improve resource utilization. In addition, considering that the radio frequency channel includes multiple components, the radio frequency channel is shared, which reduces a quantity of components required for a system and development costs of the system. In addition, in this embodiment, the switch module is disposed, so that the access side and the backhaul side can share a baseband transmit module and a baseband receive module, achieving an effect of free data exchange between that the access side and the backhaul side.

Figure 10:
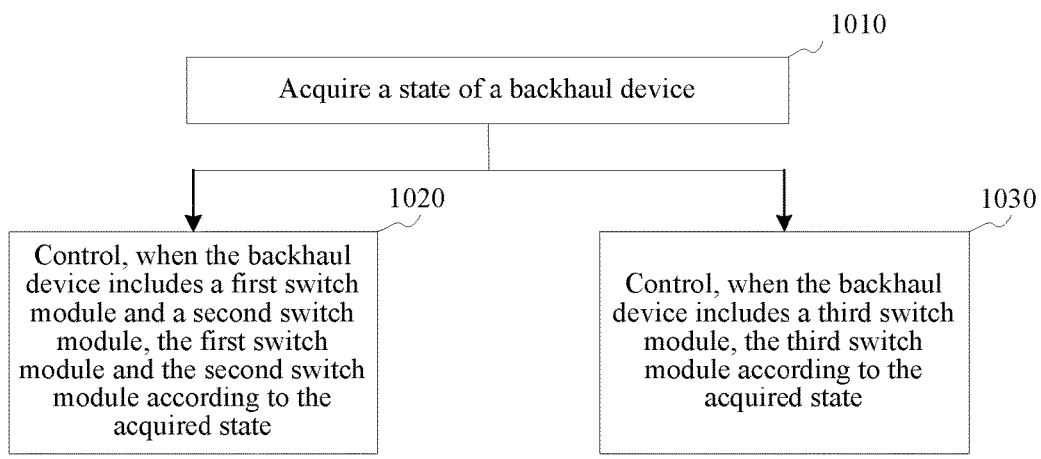
FIG. 10 is a method flowchart of a backhaul device control method according to another embodiment of the present invention.

Referring to FIG. 10, FIG. 10 shows a method flowchart of a backhaul device control method according to another embodiment of the present invention. The backhaul device control method may be used to control the backhaul device provided in each of the foregoing embodiments, and the control method may include the following steps:

Step 1010: Acquire a state of a backhaul device.

The backhaul device may acquire its own state. Specifically, it can be learned according to a specific structure of the backhaul device disclosed in the foregoing embodiments that the backhaul device may acquire the state of the backhaul device by using a control module. In addition, during actual implementation, in the backhaul device, a storage module that stores the state of the backhaul device may be connected to the control module in different manners, and when connection manners are different, methods used by the control module to acquire the state of the backhaul device are also different. Therefore, according to a connection manner between the storage module that stores the state of the backhaul device and the control module, the method used the control module to acquire the state of the backhaul device may include at least one of the following manners:

First, when the backhaul device includes a first storage module, the state of the backhaul device is read from the first storage module by using a dedicated line connected to the first storage module.

In a first possible implementation manner, when the backhaul device includes the first storage module, because the first storage module is connected to the control module by using the dedicated line, and states of the backhaul device at different moments are stored in the first storage module, the control module may read the state of the backhaul device from the first storage module by using the dedicated line connected to the first storage module.

Second, when the backhaul device includes a second storage module, the state of the backhaul device is read from the second storage module by using a line connected to another end of a radio frequency channel.

In a second possible implementation manner, when the backhaul device includes the second storage module, because the second storage module is connected to the control module by using the line between the another end of the radio frequency channel and the control module, and states of the backhaul device at different moments are stored in the second storage module, the control module may read the state of the backhaul device from the second storage module by using the line connected to the another end of the radio frequency channel.

Step 1020: Control a first switch module and a second switch module according to the acquired state when the backhaul device includes the first switch module and the second switch module.

Because connection statuses of both the first switch module and the second switch module are related to the state of the backhaul device, after the control module acquires the state of the backhaul device, the control module may control the first switch module and the second switch module according to the acquired state.

The first switch module is configured to maintain a connected state between an access-side baseband receive module and one end of the radio frequency channel when the backhaul device is in an access state;

the first switch module is further configured to maintain a connected state between a backhaul-side baseband receive module and the one end of the radio frequency channel when the backhaul device is in a backhaul state;

the second switch module is configured to maintain a connected state between the another end of the radio frequency channel and an access antenna when the backhaul device is in the access state; and the second switch module is further configured to maintain a connected state between the another end of the radio frequency channel and a backhaul antenna when the backhaul device is in the backhaul state.

Step 1030: Control a third switch module according to the acquired state when the backhaul device includes the third switch module.

When the backhaul device further includes the third switch module, because a connection status of the third switch module is also related to the state of the backhaul device, after the control module acquires the state of the backhaul device, the control module may control the third switch module according to the acquired state, where:

the third switch module is configured to maintain a connected state between the access-side baseband transmit module and the one end of the radio frequency channel when the backhaul device is in the access state; and the third switch module is further configured to maintain a connected state between the backhaul-side baseband transmit module and the one end of the radio frequency channel when the backhaul device is in the backhaul state.

In conclusion, according to the backhaul device control method provided in this embodiment, a switch module is disposed, so that an access side and a backhaul side can share a same radio frequency channel. Therefore, problems of low resource utilization of a radio frequency channel and high development costs in the prior art are resolved and the radio frequency channel can be shared, so as to improve resource utilization. In addition, considering that the radio frequency channel includes multiple components, the radio frequency channel is shared, which reduces a quantity of components required for a system and development costs of the system.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A backhaul device, comprising:
an access-side baseband transmitter, an access-side baseband receiver, a backhaul-side baseband transmitter, a backhaul-side baseband receiver, a radio frequency channel, a first switch, a second switch, an access antenna, and a backhaul antenna;

the access-side baseband transmitter and the backhaul-side baseband transmitter are separately connected to one end of the radio frequency channel;

the access-side baseband receiver and the backhaul-side baseband receiver are separately connected to one end of the first switch, and another end of the first switch is connected to the one end of the radio frequency channel;

the first switch is configured to maintain a connected state between the access-side baseband receiver and the one end of the radio frequency channel when the backhaul device is in an access state;

the first switch is further configured to maintain a connected state between the backhaul-side baseband receiver and the one end of the radio frequency channel when the backhaul device is in a backhaul state;

one end of the second switch is connected to another end of the radio frequency channel, and another end of the second switch is separately connected to the access antenna and the backhaul antenna;

the second switch is configured to maintain a connected state between the another end of the radio frequency channel and the access antenna when the backhaul device is in the access state; and the second switch is further configured to maintain a connected state between the another end of the radio frequency channel and the backhaul antenna when the backhaul device is in the backhaul state, wherein:

the access-side baseband transmitter sends baseband data to the radio frequency channel when the backhaul device is in the access state, the backhaul-side baseband transmitter sends the baseband data to the radio frequency channel when the backhaul device is in the backhaul state, the backhaul device sends broadcast information when a terminal is started, and the backhaul device negotiates, using the broadcast information, with the terminal about when to perform access and when to perform backhaul.

2. The device according to claim 1, wherein:
the access-side baseband transmitter and the backhaul-side baseband transmitter are separately connected to the one end of the radio frequency channel by using a third switch;

the third switch is configured to maintain a connected state between the access-side baseband transmitter and the one end of the radio frequency channel when the backhaul device is in the access state; and the third switch is further configured to maintain a connected state between the backhaul-side baseband transmitter and the one end of the radio frequency channel when the backhaul device is in the backhaul state.

3. The device according to claim 1, wherein the device further comprises:
a controller connected to the first switch and the second switch, and when the backhaul device comprises a third switch, the controller is further connected to the third switch;

the controller is configured to acquire a state of the backhaul device;

the controller is further configured to control the first switch and the second switch according to the acquired state when the backhaul device comprises the first switch and the second switch; and the controller is further configured to control the third switch according to the acquired state when the backhaul device comprises the third switch.

4. The device according to claim 3, wherein the device further comprises a first storage disposed in the radio frequency channel, wherein the first storage is connected to the controller by using a dedicated line;

the first storage is configured to store preset states of the backhaul device at different moments; and the controller is further configured to read the state of the backhaul device from the first storage by using the dedicated line.

5. The device according to claim 3, wherein the device further comprises a second storage disposed in the radio frequency channel, wherein the second storage is connected to the controller by using a line between the another end of the radio frequency channel and the controller;

the second storage is configured to store preset states of the backhaul device at different moments; and the controller is further configured to read the state of the backhaul device from the second storage by using the line between the another end of the radio frequency channel and the controller.

6. The device according to claim 1, wherein the radio frequency channel comprises:
a transmitter, a receiver connected to the first switch, a circulator separately connected to the transmitter and the receiver, and a filter whose one end is connected to the circulator, wherein another end of the filter is connected to the second switch;

when the backhaul device does not comprise a third switch, the transmitter is separately connected to the access-side baseband transmitter and the backhaul-side baseband transmitter; and when the backhaul device comprises the third switch, the transmitter is connected to the third switch.

7. The device according to claim 1, wherein:

when there are two or more radio frequency channels, each radio frequency channel separately corresponds to a group of the access-side baseband transmitter, the access-side baseband receiver, the backhaul-side baseband transmitter, and the backhaul-side baseband receiver;

when the backhaul device comprises a first storage, two or more radio frequency channels share the first storage; and when the backhaul device comprises a second storage, two or more radio frequency channels share the second storage.

8. The device according to claim 1, wherein:
the access-side baseband transmitter is configured to be connected directly to the one end of the radio frequency channel.

9. The device according to claim 1, wherein:
the backhaul-side baseband transmitter is configured to be connected directly to the one end of the radio frequency channel.

10. The device according to claim 1, wherein:
the access-side baseband receiver is configured to be connected directly to the one end of the first switch.

11. The device according to claim 1, wherein:
the backhaul-side baseband receiver is configured to be connected directly to the one end of the first switch.

12. The device according to claim 1, wherein the access-side baseband transmitter and the backhaul-side baseband transmitter share the radio frequency channel.

* * * * *